_(12)_ United States Patent
Kumagai et al.

(10) Patent No.: US 9,482,532 B2
(45) Date of Patent: Nov. 1, 2016

(54) SURVEYING INSTRUMENT AND SURVEYING OPERATION SYSTEM

(71) Applicant: Kabushiki Kaisha TOPCON, Tokyo (JP)

(72) Inventors: Kaoru Kumagai, Tokyo (JP); Minoru Chiba, Tokyo (JP); Masaru Muraki, Tokyo (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 197 days.

(21) Appl. No.: 14/466,378

(22) Filed: Aug. 22, 2014

(65) Prior Publication Data

US 2015/0052765 A1  Feb. 26, 2015

(30) Foreign Application Priority Data

Aug. 23, 2013  (JP) ................................. 2013-173522

(51) Int. Cl.
*G01C 15/02*  (2006.01)
*G01C 15/00*  (2006.01)

(52) U.S. Cl.
CPC ........... *G01C 15/006* (2013.01); *G01C 15/002* (2013.01)

(58) Field of Classification Search
CPC .. G01C 15/006; G01C 15/00; G01C 15/002; G01C 15/004; G01C 15/12
USPC .................................................. 33/290, 299
See application file for complete search history.

(56) References Cited

U.S. PATENT DOCUMENTS

| | | | | |
|---|---|---|---|---|
| 3,790,277 A | * | 2/1974 | Hogan ................. | G01C 15/004 356/139.06 |
| 5,294,970 A | * | 3/1994 | Dornbusch .......... | G01C 15/002 356/141.1 |
| 5,898,490 A | * | 4/1999 | Ohtomo ............... | G01C 15/004 356/141.1 |
| 6,023,326 A | | 2/2000 | Katayama et al. | |
| 6,046,800 A | * | 4/2000 | Ohtomo ............... | G01C 15/002 356/139.07 |
| 6,462,810 B1 | * | 10/2002 | Muraoka ............... | G01C 15/00 356/139.02 |
| 6,675,489 B2 | * | 1/2004 | Ohtomo ................. | G01C 9/06 250/559.3 |

(Continued)

FOREIGN PATENT DOCUMENTS

| | | |
|---|---|---|
| CN | 1648602 A | 8/2005 |
| CN | 101539423 A | 9/2009 |

(Continued)

OTHER PUBLICATIONS

The extended European search report issued by the European Patent Office on Feb. 4, 2015, which corresponds to European Patent Application No. 14182003.5-1557 and is related to U.S. Appl. Nos. 14/466,351 and 14/466,378.

(Continued)

*Primary Examiner* — Christopher Fulton
(74) *Attorney, Agent, or Firm* — Studebaker & Brackett PC (57) ABSTRACT

A surveying instrument includes a pedestal provided with a guide light irradiation unit provided with a light source to irradiate with guide light indicating a collimation direction of the surveying instrument to an operator, a tracking optical system which locks a target, a ranging optical system which ranges a distance to the target, and a control circuit which calculates surveying data by a ranging result of the ranging optical system, and a transmitting and receiving unit which receives survey setting point data regarding a survey setting operation and sends the surveying data obtained by the control circuit.

2 Claims, 10 Drawing Sheets

(56) References Cited

U.S. PATENT DOCUMENTS

| | | | |
|---|---|---|---|
| 7,110,102 B2* | 9/2006 | Ohtomo | G01C 15/002 356/141.1 |
| 7,274,802 B2* | 9/2007 | Kumagai | G01C 15/002 356/4.01 |
| 8,294,769 B2* | 10/2012 | Otani | E02F 3/847 348/159 |
| 9,273,960 B2* | 3/2016 | Kumagai | G01C 15/002 |
| 2004/0246498 A1* | 12/2004 | Kumagai | G01C 15/002 356/614 |
| 2005/0189469 A1 | 9/2005 | Sugiura | |
| 2009/0235543 A1 | 9/2009 | Hayashi et al. | |
| 2009/0241358 A1 | 10/2009 | Ohtomo et al. | |
| 2012/0212588 A1 | 8/2012 | Ohtomo et al. | |
| 2012/0242830 A1 | 9/2012 | Kumagai et al. | |

FOREIGN PATENT DOCUMENTS

| | | |
|---|---|---|
| CN | 101663561 A | 3/2010 |
| CN | 102645180 A | 8/2012 |
| EP | 2503284 A2 | 9/2012 |
| JP | H10-332371 A | 12/1998 |
| JP | 2012-026894 A | 2/2012 |
| JP | 2012-202821 A | 10/2012 |

OTHER PUBLICATIONS

The extended European search report issued by the European Patent Office on Jan. 23, 2015, which corresponds to European Patent Application No. 14182011.8-1557 and is related to U.S. Appl. No. 14/466,378.

TOPCON; "TOPCON ES Series Reflectorless Total Stations"; XP055164738; "URL:http://www.topconpositioning.com/sites/default/files/Topcon_ES_Series_Brochure_A_US_US_Low.pdf"; Aug. 8, 2012.

An Office Action issued by the Chinese Patent Office on Mar. 28, 2016, which corresponds to Chinese Patent Application No. 201410399886.1 and is related to U.S. Appl. Nos. 14/466,378 and 14/466,351.

The first Office Action issued by the Chinese Patent Office on May 23, 2016, which corresponds to Chinese Patent Application No. 201410400032.0 and is related to U.S. Appl. Nos. 14/466,378 and 14/466,351.

\* cited by examiner

OPTICAL PATH IN HORIZONTAL DIRECTION AS SEEN FROM TOP

FIG.11B

OPTICAL PATH IN VERTICAL DIRECTION AS SEEN FROM SIDE

SURVEYING INSTRUMENT AND SURVEYING OPERATION SYSTEM

PRIORITY CLAIM

The present application is based on and claims priority from Japanese Patent Application No. 2013-173522, filed on Aug. 23, 2013, the disclosure of which is hereby incorporated by reference in its entirety.

BACKGROUND

1. Field of the Invention

The present invention relates to a surveying instrument including a guide light optical system which irradiates with guide light and a surveying operation system.

2. Description of the Related Art

A surveying instrument provided with a guide light irradiation unit which irradiates with guide light indicating a collimation direction of a surveying instrument to an operator is conventionally known (refer to, for example, JP2012-202821A).

Such a surveying instrument includes a base and a pedestal rotating in a horizontal direction relative to the base. The pedestal is provided with a support member. The support member supports a lens barrel of a ranging optical system to be rotatable in a vertical direction, and is provided with various driving mechanisms and control mechanisms.

A cover member is attached to the pedestal to cover the support member and the lens barrel of the ranging optical system as well as respective mechanisms. The guide light irradiation unit is provided in the top part of the cover member.

An operator carries a portable wireless transceiver as a controller, so that coordinate data of a survey setting point is sent to a wireless transceiver of the surveying instrument from the portable wireless transceiver.

Upon the completion of the surveying of a certain survey setting point, the pedestal of the surveying instrument rotates in a horizontal direction while irradiating the next survey setting point with the guide light.

However, the surveying operation system with such a surveying instrument has an energy saving problem because the pedestal rotates while irradiating with the guide light.

It is therefore considered that energy is saved by stopping the irradiation of the guide light when a target is locked, and the locking is informed to an operator. However, when the irradiation of the guide light is stopped in the case of locking the target, the surveying operation efficiency by an operator may be deteriorated because target light is turned off if the locking of target is released for some reason after the target is locked.

SUMMARY

The present invention has been made in view of the above circumferences, and an object of the present invention is to provide a surveying instrument capable of saving energy by tuning off guide light when a target is locked, and preventing deterioration in surveying operation efficiency resulting from the turning off of the target light.

To attain the above object, one embodiment of the present invention provides a surveying instrument including a pedestal provided with a guide light irradiation unit provided with a light source to irradiate with guide light indicating a collimation direction of the surveying instrument to an operator, a tracking optical system which locks a target, a ranging optical system which ranges a distance to the target, and a control circuit which calculates surveying data by a ranging result of the ranging optical system, and a transmitting and receiving unit which receives survey setting point data regarding a survey setting operation and sends the surveying data obtained by the control circuit, wherein the control circuit turns off the light source when the target is locked, rotates the pedestal such that an optical axis faces in a direction of a survey setting point when the locking of the target is released, stops the rotation of the pedestal, turns on the light source again, and performs searching and scanning with tracking light.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DESCRIPTION OF THE PREFERRED EMBODIMENT

[Embodiment]

Hereinafter, an embodiment of a surveying instrument according to the present invention will be described with reference to the drawings.

(Configuration of Surveying Instrument)

Figure 1:
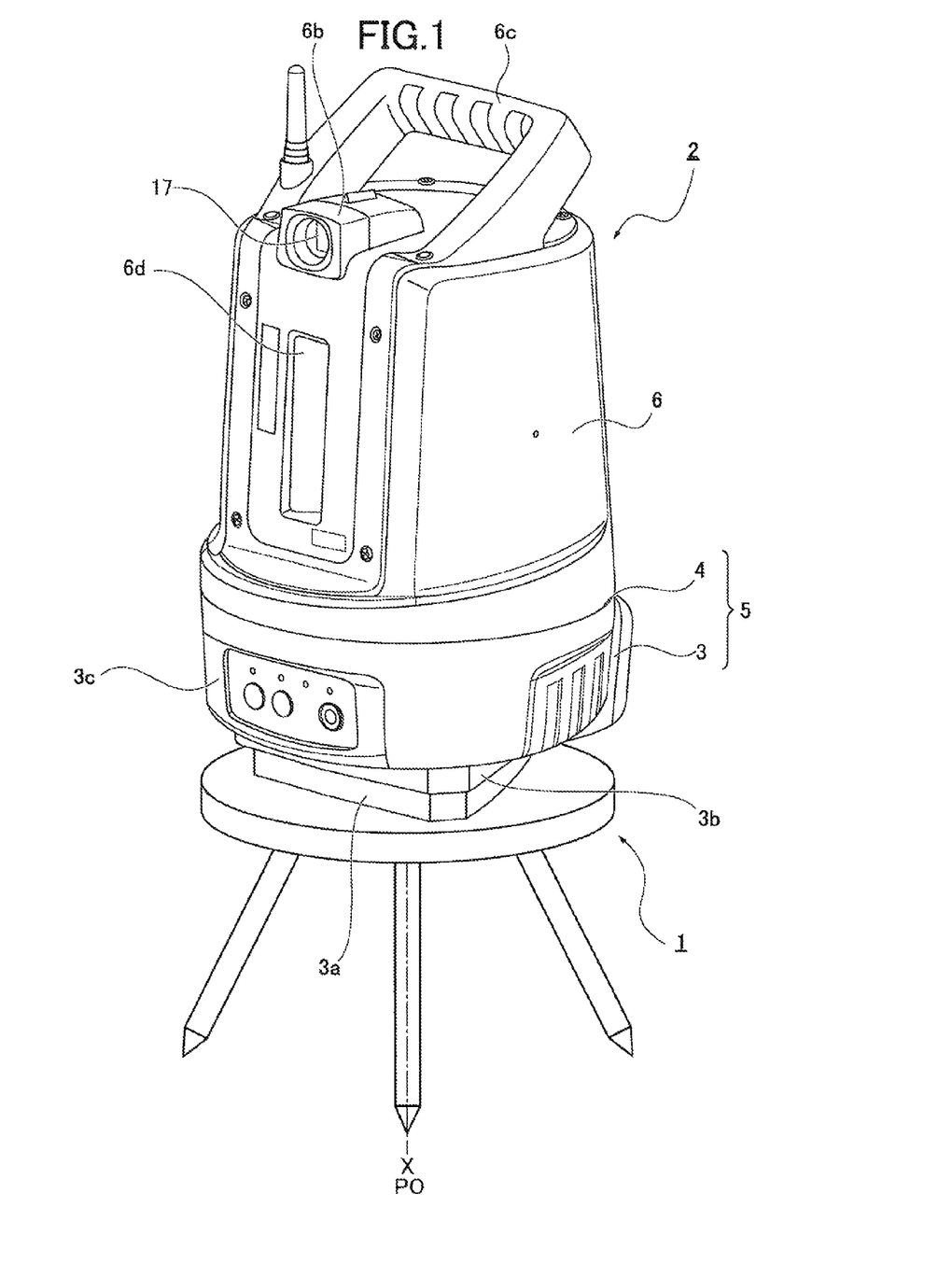
FIG. 1 is a perspective view illustrating a general configuration of a surveying instrument according to an embodiment of the present invention.

Referring to FIG. 1, reference number 1 denotes a tripod and reference number 2 denotes a surveying instrument. The surveying instrument 2 includes a main body 5 having a base 3 and a pedestal 4 rotating in a horizontal direction relative to the base 3 as illustrated in FIG. 2, and a cover member 6, as illustrated in FIG. 1.

Figure 2:
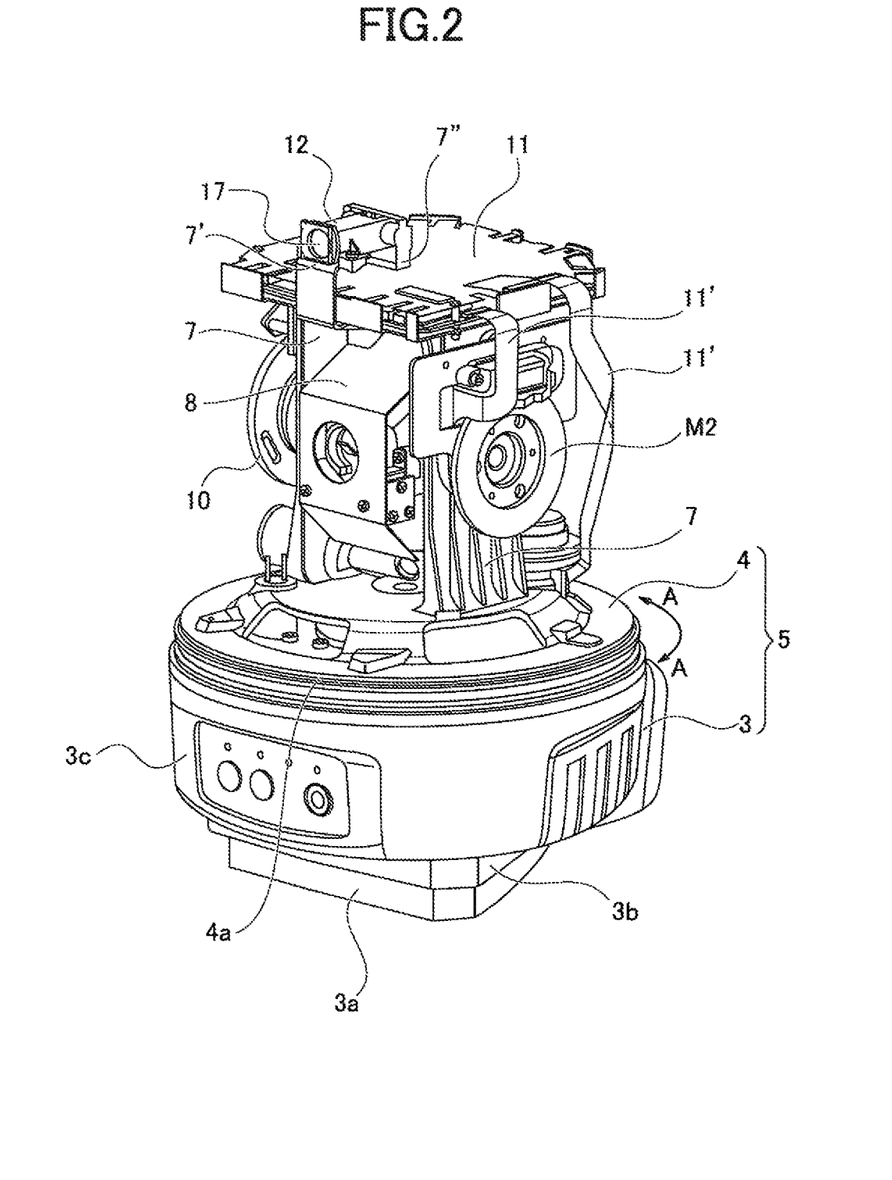
FIG. 2 is a schematic view illustrating an inside configuration of a surveying instrument according to the embodiment of the present invention.

The base 3 includes a seat 3a fixed to the tripod 1, a leveling base 3b having a not-shown leveling screw, and a case 3c having inside thereof a driving mechanism such as a horizontal direction-driving motor M1 (refer to FIG. 4) which rotates and drives the pedestal 4 in a horizontal direction (arrow A direction, as illustrated in FIG. 2).

Figure 3:
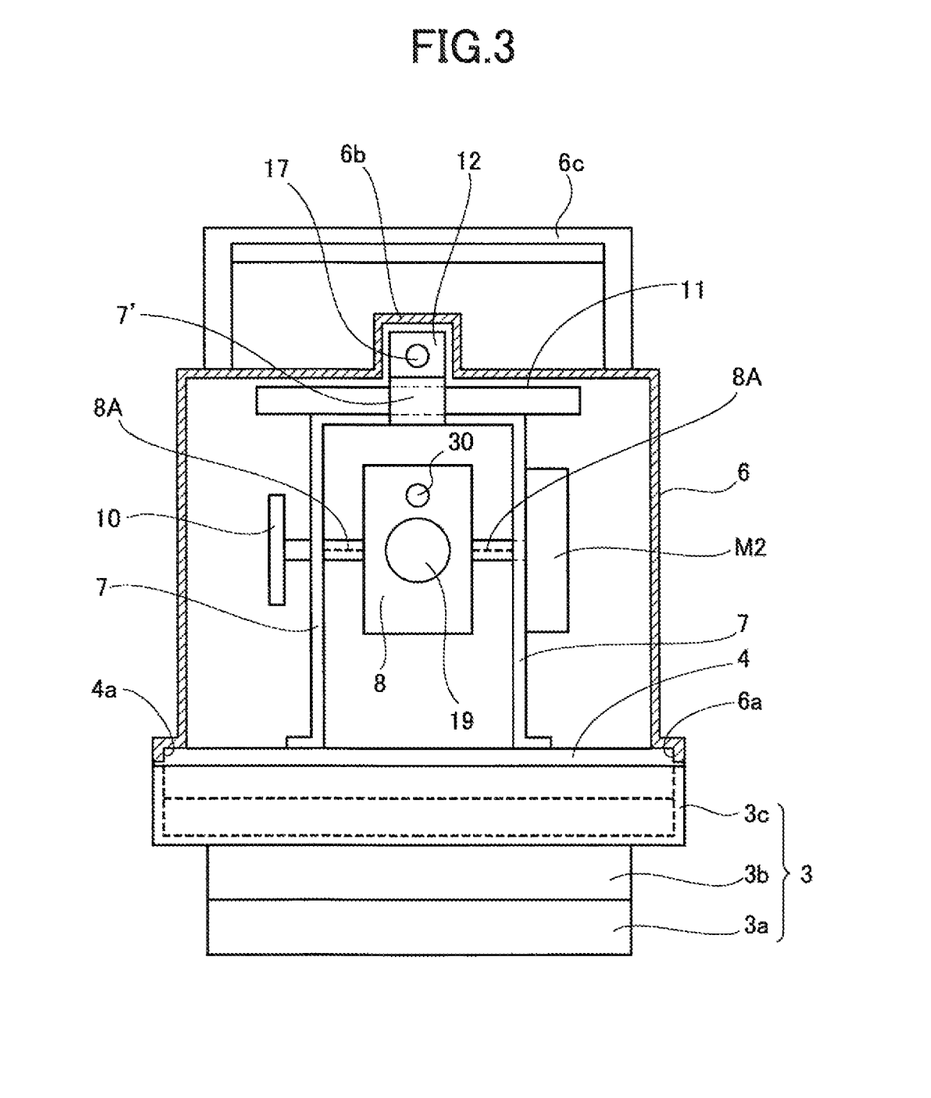
FIG. 3 is a view illustrating a relationship between a cover member and a main body of the surveying instrument according to the embodiment of the present invention.

The pedestal 4 is provided with a support member 7, as illustrated in FIGS. 2, 3. The support member 7 is provided with a horizontal axis 8A, 8A which supports a lens barrel 8 of a ranging optical system and a tracking optical system to be rotatable in a vertical direction, as illustrated in FIG. 3.

A vertical direction-driving motor M2 which rotates and drives the lens barrel 8 in a vertical direction is fixed to one end portion of the horizontal axis 8A. An encoder 10 which detects a rotation angle of the lens barrel 8 is provided in the other end portion of the horizontal axis 8A.

A control circuit board 11, which controls the rotation of the pedestal 4 in a horizontal direction and the rotation of the lens barrel 8 in a vertical direction, and a guide light irradiation unit 12 are fixed to the upper end portion of the support member 7. The horizontal direction-driving motor M1, vertical direction-driving motor M2, encoder 10, and the like are connected by a flexible print circuit 11'.

The control circuit board 11 is provided with an after-described CPU. The guide light irradiation unit 12 is used for indicating the collimation direction of the main body 5 of the surveying instrument to an operator.

In this case, the guide light irradiation unit 12 is supported by standing plates 7', 7" cut and rising from the upper end portion of the support member 7. A through-hole through which the standing plate 7" penetrates is formed in the control circuit board 11.

As illustrated in FIG. 3, the cover member 6 includes an opening 6a into which an outer circumference portion 4a of the pedestal 4 is fitted, a cover 6b which covers the guide light irradiation unit 12, a handle 6c, and a window 6d extending in an up and down direction. In addition, the outer circumference portion 4a of the pedestal 4 is provided with a not-shown seal member for preventing the entrance of rainwater or the like.

A space is formed between the cover member 6 and the guide light irradiation unit 12, and a space is also formed between the cover member 6 and the control circuit board 11. With this configuration, the cover member 6 is prevented from having contact with the guide light irradiation unit 12 when attaching and detaching the cover member 6.

Figure 4:
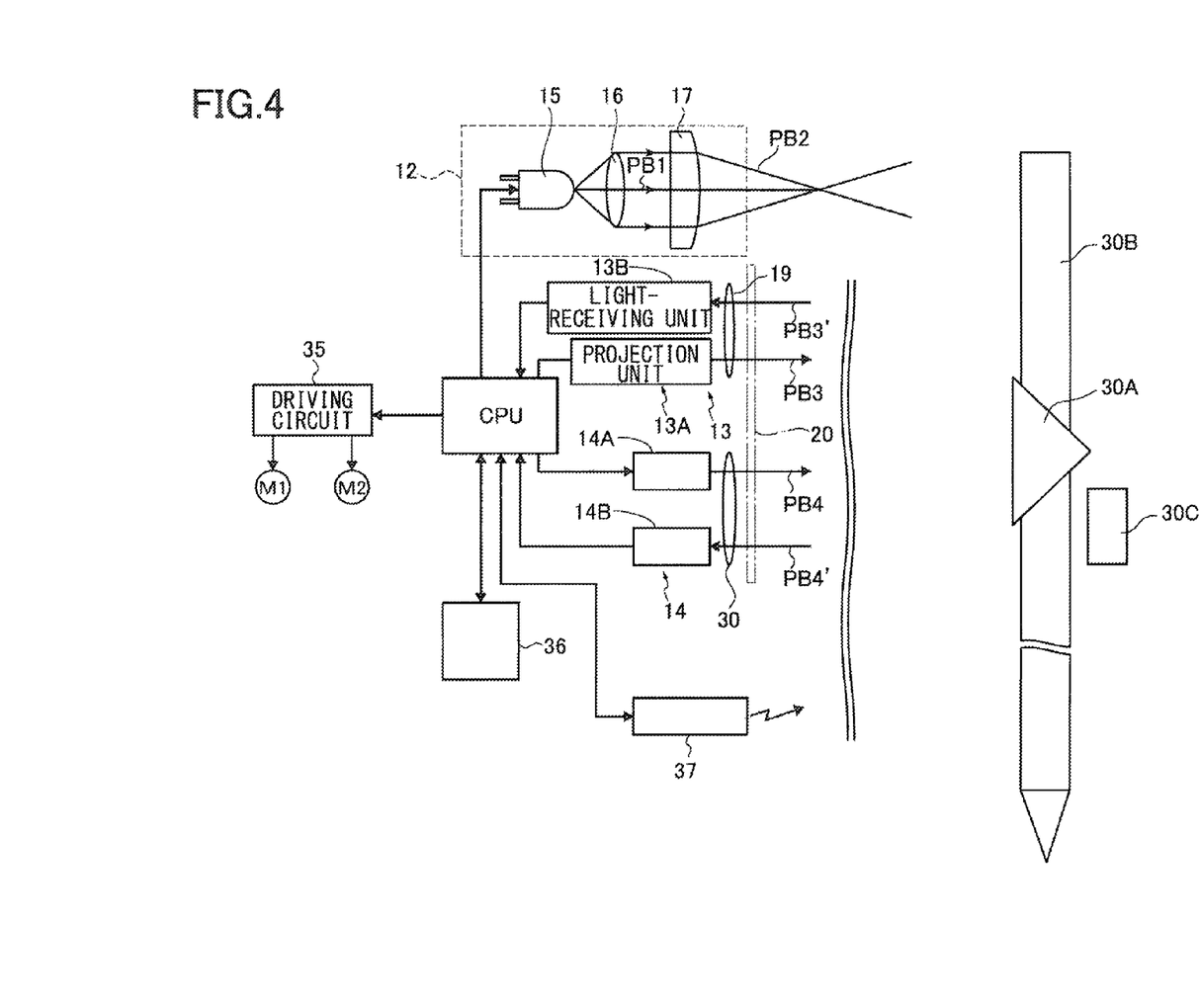
FIG. 4 is a block circuit diagram illustrating a configuration of an optical system of the surveying instrument illustrated in FIGS. 1, 2.

The lens barrel 8 is provided with a ranging optical system 13 and a tracking optical system 14, as illustrated in FIG. 4. An inclination of the optical system of the lens barrel 8 is obtained by measuring an angle with the encoder 10. Before describing the ranging optical system 13 and the tracking optical system 14, the optical system of the guide light irradiation unit 12 will be described.

(Configuration of Optical System of Guide Light Irradiation Unit 12)

Figure 5:
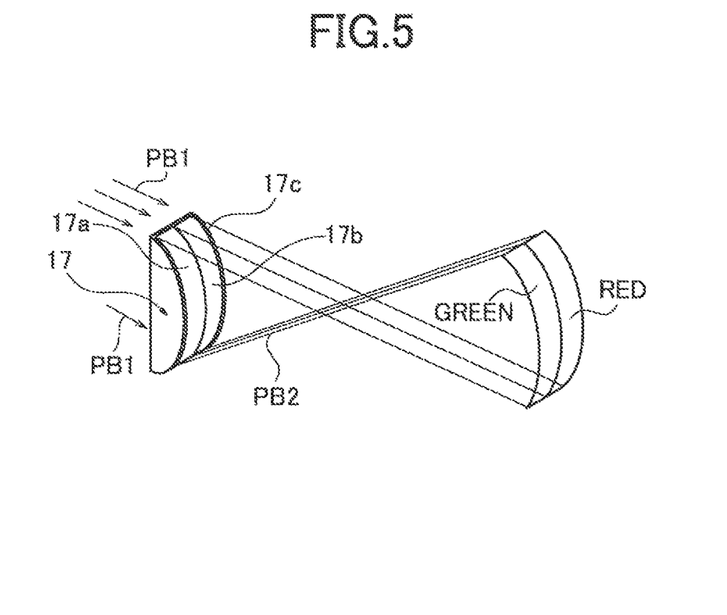
FIG. 5 is a view illustrating one example of a cylindrical lens illustrated in FIG. 4.

The guide light irradiation unit 12 includes, as illustrated in FIG. 4, for example, a laser light source 15, collimator lens 16, and cylindrical lens 17, as illustrated in FIG. 5. The laser light source 15 generates visible white laser light.

The collimator lens 16 converts the visible white laser light into a parallel light beam PB1. The cylindrical lens 17 converts the parallel light beam PB1 into fan-like guide light PB2 extending in a vertical up and down direction.

A slit filter 17a which extends in a direction having a power and transmits green light and a slit filter 17b which extends in a direction having a power and transmits red light are formed in the cylindrical lens 17, as illustrated in FIG. 5. Reference number 17c is a slit mask. The laser light source 15 is controlled by a CPU, as illustrated in FIG. 4, and starts emitting upon the turning on of a not-shown power source switch.

(Configuration of Ranging Optical System 13)

Figure 6:
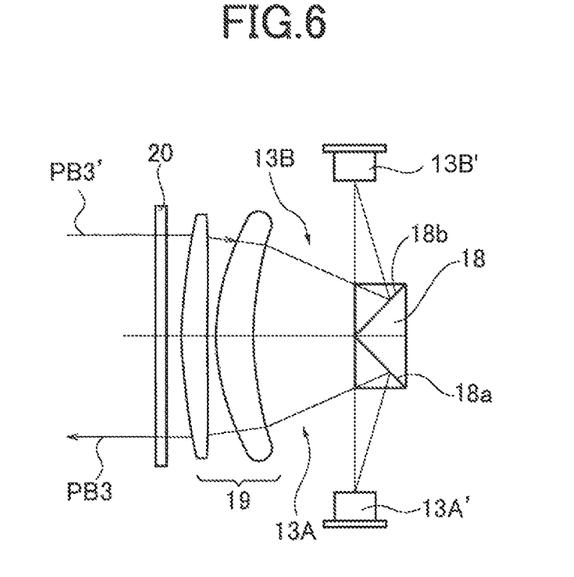
FIG. 6 is an optical view illustrating one example of a ranging optical system illustrated in FIG. 4.

The ranging optical system 13 includes a projection unit 13A and a light-receiving unit 13B, as illustrated in FIG. 4. The projection unit 13A includes a light source 13A' as illustrated in FIG. 6 and the light-receiving unit 13B includes a light-receiving element 13B'.

The light source 13A' emits an infrared laser beam. The infrared laser beam is reflected by the dichroic mirror surface 18a of the beam splitter 18 toward an objective lens 19, and is emitted as a parallel light beam PB3 from the lens barrel 8 through a cover glass 20.

The parallel light beam PB3 is reflected by a corner cube (target) 30A, as illustrated in FIG. 4, returns to the objective lens 19 through the cover glass 20 as a reflection light beam PB3', is reflected by the dichroic mirror surface 18b of the beam splitter 18, and is converged in the light-receiving element 13B'.

The output (ranging result) of the light-receiving element 13B' is input to a calculator of the CPU provided in the control circuit board 11. The CPU calculates a distance to the corner cube 30A based on the output of the light-receiving element 13B'. The corner cube 30A is fixed to a surveying pole 30B which is carried by an operator.

(Configuration of Tracking Optical System 14)

Figure 7:
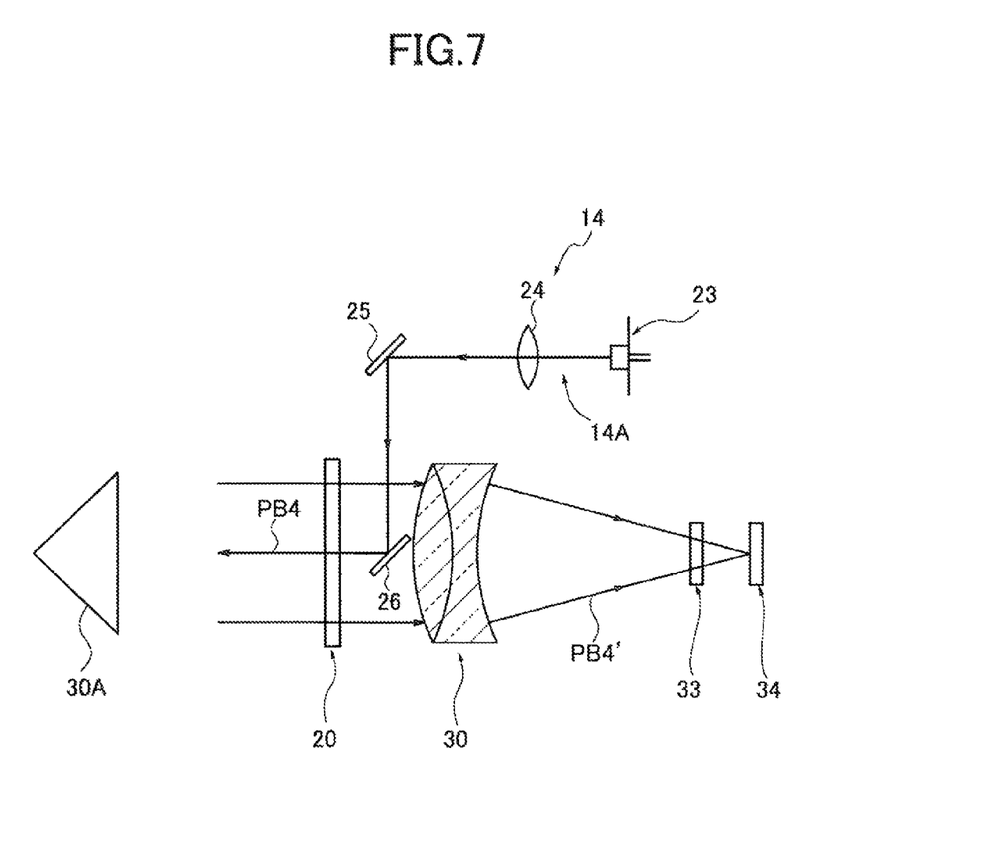
FIG. 7 is an optical view illustrating one example of a tracking optical system illustrated in FIG. 4.

The tracking optical system 14 is used to lock the corner cube 30A. The tracking optical system 14 includes a laser diode 23, collimator lens 24, reflection mirrors 25, 26, objective lens 30, cover glass 20, light noise eliminating filter 33, and light-receiving element 34, as illustrated in FIG. 7.

The laser diode 23, collimator lens 24, and reflection mirrors 25, 26 constitute the projection unit 14A. The objective lens 30, light noise eliminating filter 33, and light-receiving element 34 constitute the light-receiving element 14B.

The laser diode 23 emits as tracking light infrared laser light PB4 having a wavelength different from a wavelength of the ranging light of the ranging optical system 13. The infrared laser light PB4 is changed into an approximately parallel light beam by the collimator lens 24.

The infrared laser light PB4 reflected by the reflection mirrors 25, 26 is emitted outside the surveying instrument 2, and the searching and scanning of the corner cube 30A are performed by the infrared laser light PB4. When the corner cube 30A is located in the searching range, the infrared laser light PB4 is reflected by the corner cube 30A, and returns to the objective lens 30.

The reflection light PB4' of the infrared laser light PB4 is converged by the objective lens 30, and is imaged on the light-receiving element 34 through the light noise eliminating filter 33. The light noise eliminating filter 33 performs an operation which transmits light having a wavelength which is the same as that of the infrared laser beam.

(Configuration of Driver)

The surveying instrument 2 includes a driving circuit 35, as illustrated in FIG. 4. The horizontal direction-driving motor M1 and the vertical direction-driving motor M2 are connected to the driving circuit 35.

The driving circuit 35 is controlled by the CPU, and performs an operation which outputs a rotation permission signal of the horizontal direction-driving motor M1 to the driving circuit 35 when a wireless transmitting and receiving unit 37 receives a lens barrel rotation permission signal.

The CPU calculates the rotation angle to a next survey setting point P2 in a horizontal direction from the present angle to which the lens barrel 8 of the surveying instrument 2 faces in a horizontal direction by a standard orientation signal and the lens barrel rotation permission signal.

Figure 8:
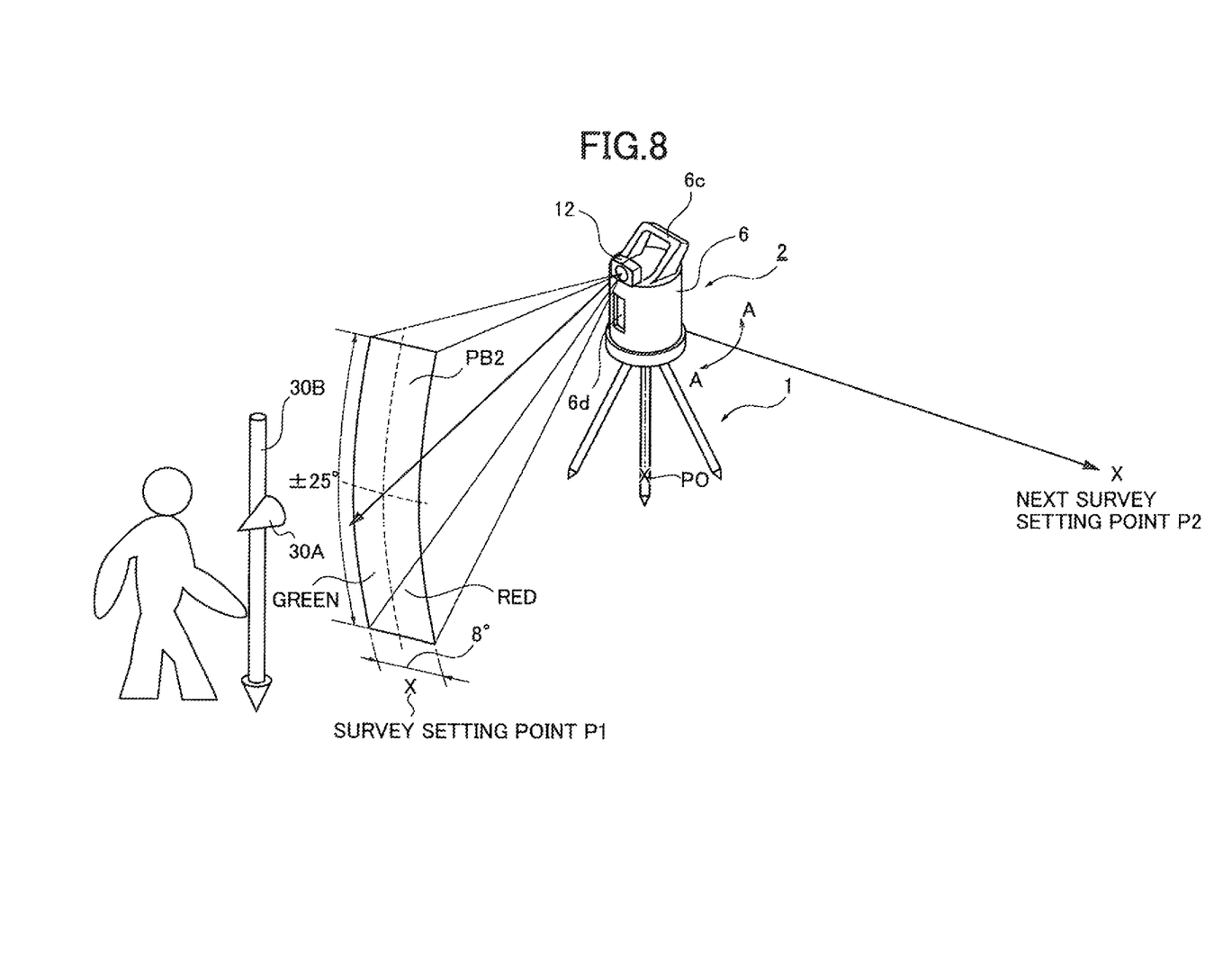
FIG. 8 is a view illustrating one example of a surveying operation by an operator.

More specifically, a next irradiation direction with the guide light PB2 is obtained by the calculation using the survey setting point data from the direction that the surveying instrument 2 irradiates with the guide light PB2 (direction that survey setting point P1 exists, as illustrated in FIG. 8). The lens barrel 8 thereby rotates in a horizontal direction toward the direction that the after-described next survey setting point P2 exists, and the rotation is stopped in this position.

(One Example of Operation of CPU)

The CPU includes an operation which outputs a rotation permission signal of the vertical direction-driving motor M2 to the driving circuit 35 when the rotation of the lens barrel 8 stops in the direction of the next survey setting point P2.

The driving circuit 35 includes an operation which alternatively forward-rotates and reverse-rotates the vertical direction-driving motor M2. With this operation, the infrared laser light PB4 scans in an up and down direction in the next survey setting point P2.

An operator moves in a direction that the survey setting point P1 is located with the target of the guide light PB2, as illustrated in FIG. 8. Then, the operator sees the guide light PB2 made of red light and green light.

When the surveying pole 30B is stood in that position, the corner cube 30A is locked. When the pole 30B is located in the survey setting point P1, ranging to the corner cube 30A or ranging to the corner cube 30A and ranging angle is executed.

Next, the CPU obtains the distance to the corner cube 30A or the distance and the angle (three dimensional coordinate) by calculation. The distance data from the corner cube 30A in the survey setting point P1 to the surveying instrument 2 or the distance data and the angle data (three dimensional coordinate) is once stored in the storing unit 36 as measurement data.

The surveying instrument 2 includes the storing unit 36 and the wireless transmitting and receiving unit 37, as illustrated in FIG. 4. The storing unit 36 and the wireless transmitting and receiving unit 37 are connected to the CPU.

The wireless transmitting and receiving unit 37 performs an operation which sends ranging data such as the present position of an operator (distance data from surveying instrument 2 to corner cube 30A or distance data and angle data (three dimensional coordinate)) to a portable wireless transceiver 30C.

(Detailed Description of Surveying Operation System)

Hereinafter, the details of the surveying operation system using the surveying instrument according to the embodiment of the present invention will be described with reference to FIGS. 8 to 10.

As illustrated in FIG. 8, the surveying instrument 2 is placed in a known point P0. An operator sends survey setting point data regarding a surveying setting operation by the portable wireless transceiver 30C (refer to FIG. 4) (sending step).

The CPU calculates a positional relationship of the survey setting point P1, the surveying setting point P2 and the like based on the positional relationship relative to the known point P0 and a standard orientation signal, rotates the pedestal 4 such that the optical axis faces in a direction of the survey setting point P1, and stops the rotation of the pedestal 4 in that position (rotation step).

Next, the CPU controls the laser light source 15 of the guide light irradiation unit 12 to be tuned on (turning on step). The fan-like guide light PB2 extending in a vertical direction is thereby irradiated in a direction in which the optical axis faces, as illustrated in FIG. 8.

Figure 9:
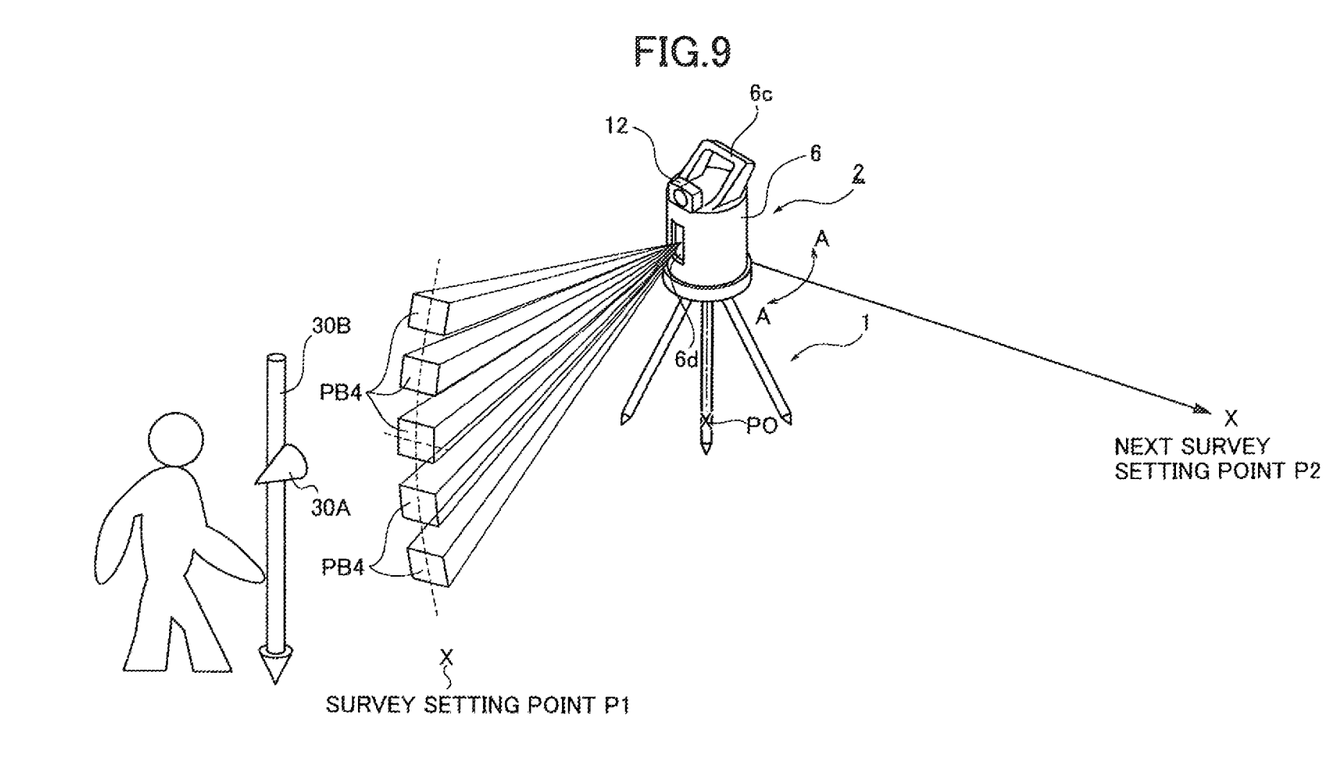
FIG. 9 is a view illustrating a state in which a target is locked and guide light is turned off.

The CPU performs searching and scanning with tracking light, as illustrated in FIG. 9. More specifically, the lens barrel 8 rotates about the horizontal axis 8A, and the searching and scanning of the target are thereby performed.

The operator moves in a direction irradiated by the guide light PB2. The guide light PB2 is made of red light and green light. In the boundary position, the red light enters into a left eye, and the green light enters into a right eye. The operator senses the light made of the mixture of these colors, so that the operator can easily find the direction of the optical axis O of the surveying instrument.

When the surveying pole 30B is stood in a position near the survey setting point P1 by the operator, the target is locked by the searching and scanning with the tracking light, and the pedestal 4 rotates, so that the optical axis O is directed to the center of the target. When the target on the side of the operator is locked, the laser light source 15 is turned off (turning off step).

Moreover, the portable wireless transceiver 30C vibrates at the same time as the target is locked. The operator is thereby able to confirm that the target is locked without watching a screen of the portable wireless transceiver 30C.

In addition, the portable wireless transceiver 30C may be configured to vibrate when the target is located near a position where a target can be locked although the target is not locked.

The target is thereby automatically tracked, and the ranging is also started. The operator moves to the position of the survey setting point P1 while holding the surveying pole 30B. Then, the CPU calculates a distance difference of the survey setting point P1 and the target based on the ranging data from the known point P0 to the target and the survey setting point data.

The data of the distance difference is sent to the portable wireless transceiver 30C from the wireless transmitting and receiving unit 37. The position of the target to the known point P0 is displayed on a not-shown display of the portable wireless transceiver 30C.

When the distance difference of the survey setting point P1 and the target is within a predetermined range (within 5 m, for example), a reduced scale magnification of the distance difference of the target relative to the survey setting point P1 is changed to be reduced, and is displayed on the display.

The operator is thereby able to precisely confirm the positional relationship relative to the survey setting point P1. The CPU calculates the surveying data such as ranging data, angle measuring data, and the like when the target is locked, and the surveying result is sent to the portable wireless transceiver 30C. When the target is within the allowable range relative to the survey setting point P1, the operator performs a piling operation, for example.

When the locking of the target is disturbed for some reason near the survey setting point P1, the tracking light is once turned off, the pedestal 4 returns in a direction of the survey setting point P1 designated by the survey setting point data, the laser light source 15 is turned on, and the searching and scanning with the tracking light is restarted.

Figure 10:
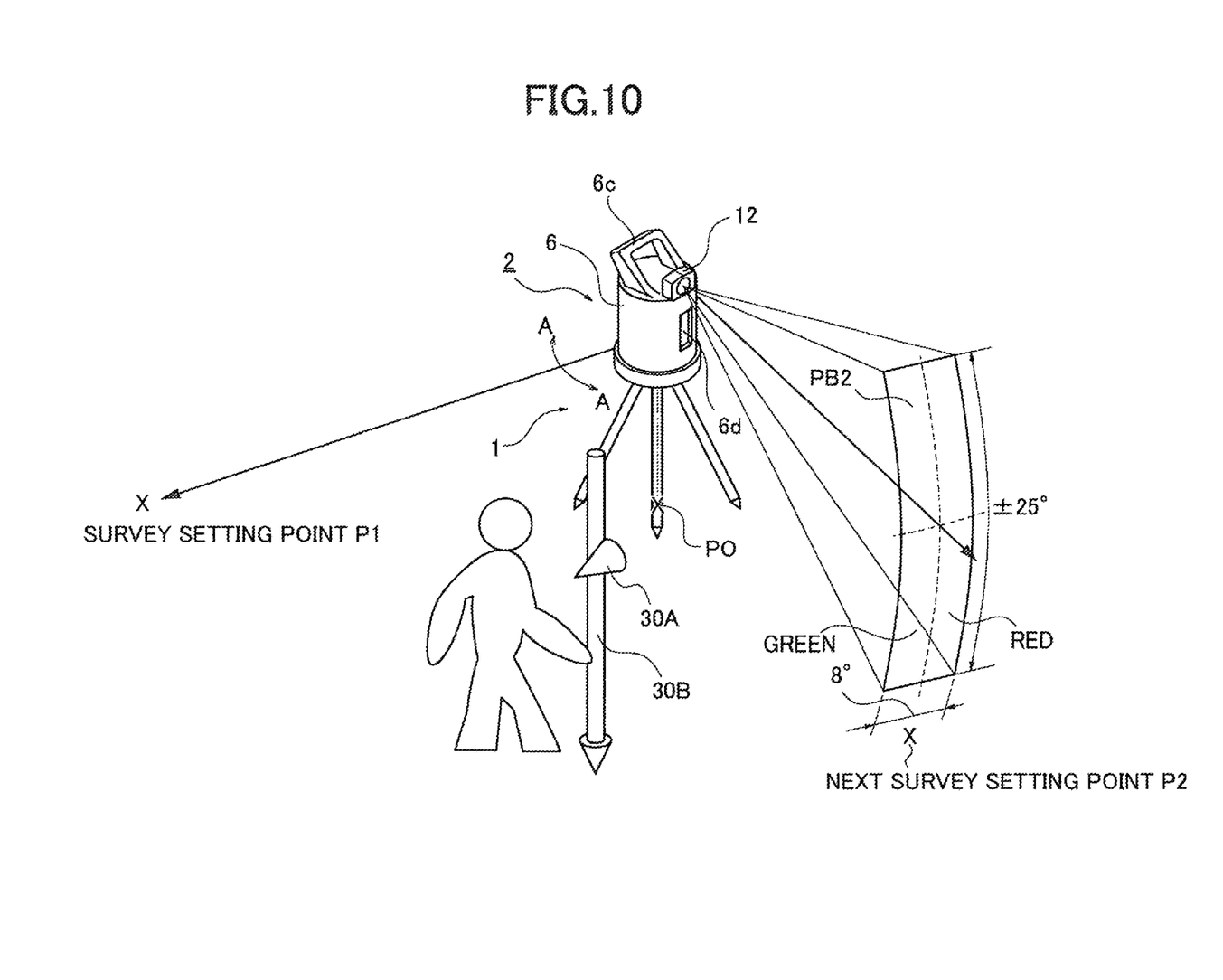
FIG. 10 is a view illustrating a state in which guide light is irradiated after the surveying instrument rotates toward a next survey setting point, and the rotation is stopped.

When the surveying data is obtained in the survey setting point P1, the pedestal 4 is stopped after rotating in a direction of the next survey setting point P2 designated by the survey setting point data, as illustrated in FIG. 10, and the laser light source 15 is turned on again (re-turning on step).

Next, when the target is locked near a direction of the next survey setting point P2, the laser light source 15 is turned off again (re-turning off step).

In the re-turning off step, when the locking of the target is disturbed for some reason, the tracking light is once turned off, the pedestal 4 again faces in a direction of the survey setting point P2 designated by the survey setting point data, the laser light source 15 is turned on again, and the searching and scanning with the tracking light is restarted.

According to the embodiment of the present invention, when the corner cube 30A is locked by the tracking optical system 14, the laser light source 15 of the guide light irradiation unit 12 is turned off. With this configuration, energy can be saved.

Moreover, when the locking of the corner cube 30A is disturbed for some reason, the tracking light is once turned off, the pedestal 4 is stopped after the pedestal 4 rotates such that the optical axis O faces in a direction of the survey setting point P1 (or survey setting point P2) designated based on the survey setting point data, the laser light source 15 is turned on again, and the searching and scanning with the tracking light is restarted.

Even when the guide light PB2 is irradiated and the searching and scanning with the tracking light are performed by turning on the laser light source 15 again toward a direction in which the optical axis of the lens barrel 8 faces when the locking of the corner cube 30A is released for some reason, the operator often moves in a direction of the survey setting point P1 (survey setting point P2) without being aware of the releasing of the locking. For this reason, a probability of recognizing the guide light PB2 is low, and a probability of locking the corner cube 30A again is also low.

On the other hand, according to the embodiment, since the optical axis faces in a direction designated by the survey setting point data, a probability that an operator recognizes the guide light PB2 is improved. A probability that the corner cube 30A is locked is also improved. As a result, the improvement in the survey operation efficiency can be improved.

(Modified Example)

Figure 11A:
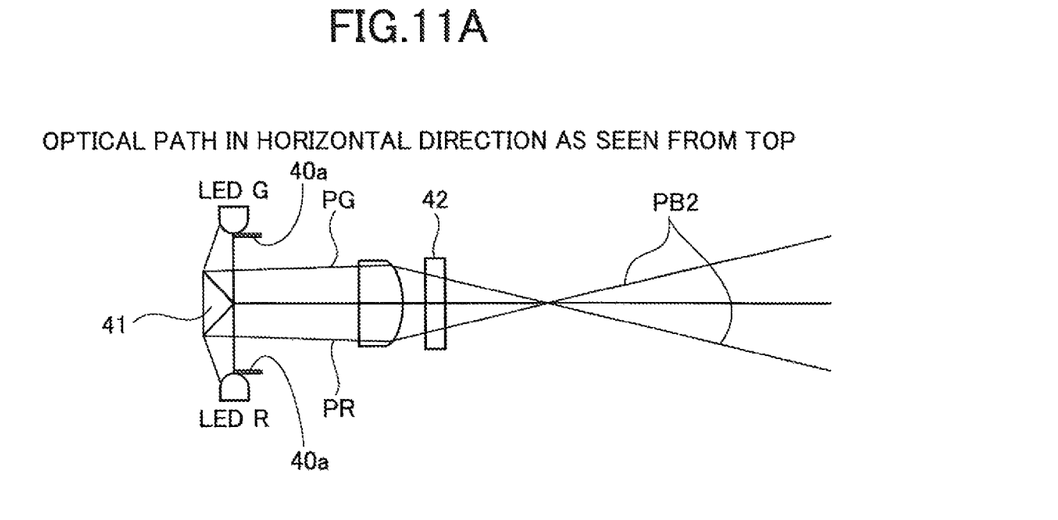
FIG. 11A is a view illustrating a modified example of a guide light irradiation unit according to the embodiment of the present invention, and illustrating an optical path as seen from the top.
Figure 11B:
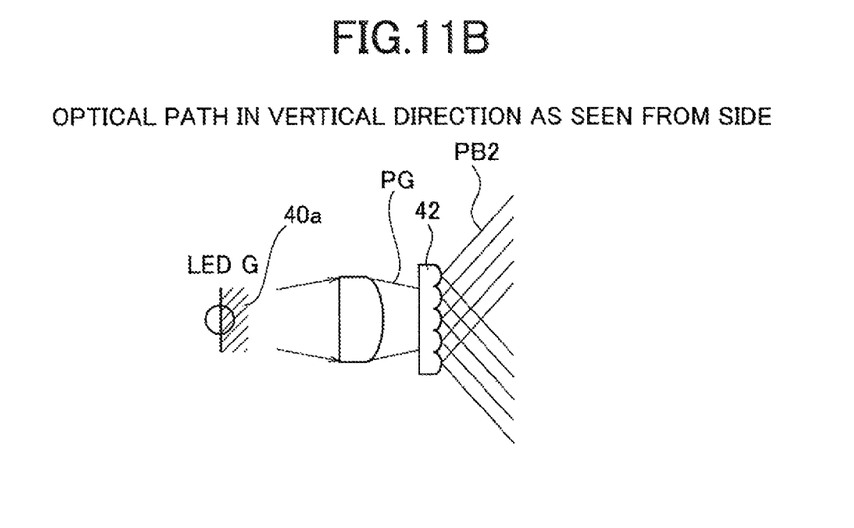
FIG. 11B is a view illustrating the modified example of the guide light irradiation unit according to the embodiment of the present invention, and illustrating the optical path as seen from the side.

FIGS. 11A, 11B are views illustrating a modified example of the guide light irradiation unit 12. In this modified example, the guide light irradiation unit 12 includes a light-emitting diode LED G which generates green light PG and a light-emitting diode LED R which generates red light PR, as illustrated in FIG. 11A.

Aperture stop members 40a, 40b are provided just in front of the light-emitting diode LED G and the light-emitting diode LED R, respectively. Each of the aperture stop members 40a, 40b is configured to cut half of each light.

The green light PG and the red light RG are reflected by a mirror prism 41, and are guided to a lenticular lens 42.

The green light PG and the red light RG are emitted from the guide light irradiation unit 12 as the fan-like guide light PB2.

In addition, in this embodiment, the objective lens 30 of the tracking optical system 14 and the objective lens 19 of the ranging optical system 13 are separated. However, the objective lens 30 of the tracking optical system 14 and the objective lens 19 of the ranging optical system 13 may be integrated.

(Another Modified Example)

By changing a flashing pattern of guide light without completely turning off the guide light, energy can be saved, and the releasing of the locking can be informed to an operator.

According to the embodiment of the present invention, when the target is locked by the tracking optical system, the light source of the guide light irradiation unit is turned off, so that energy can be saved as well as the locking can be informed to an operator.

Moreover, when the locking of the target is disturbed, the rotation of the pedestal is stopped after rotating the pedestal such that the optical axis faces in a direction of a survey setting point designated based on survey setting point data, and the light source is turned on again.

With this configuration, compared to a case in which a light source is turned on again with an optical axis being directed in a direction that the locking of a target is released, a probability of locking the target is improved as well as the recognition efficiency of the guide light is improved. As a result, the surveying operation efficiency can be improved.

Although the embodiment of the present invention has been described above, the present invention is not limited thereto. It should be appreciated that variations may be made in the embodiment described by persons skilled in the art without departing from the scope of the present invention.

What is claimed is:

1. A surveying instrument, comprising:
   a pedestal provided with a guide light irradiation unit provided with a light source to irradiate with guide light indicating a collimation direction of the surveying instrument to an operator, a tracking optical system which locks a target, a ranging optical system which ranges a distance to the target, and a control circuit which calculates surveying data by a ranging result of the ranging optical system; and
   a transmitting and receiving unit which receives survey setting point data regarding a survey setting operation and sends the surveying data obtained by the control circuit, wherein
   the control circuit turns off the light source when the target is locked, rotates the pedestal such that an optical axis faces in a direction of a survey setting point when the locking of the target is released, stops the rotation of the pedestal, turns on the light source again, and performs searching and scanning with tracking light.

2. A surveying operation system, comprising:
   a sending step of sending survey setting point data to the transmitting and receiving unit, which is provided on the side of an operator, by using the surveying instrument according to claim 1;
   a rotation step of rotating the pedestal such the optical axis of the surveying instrument faces in a direction of the survey setting point based on the survey setting point data, and stopping the rotation;
   a turning on step of turning on the light source of the guide light irradiation unit;
   a turning off step of turning off the light source when the target on the side of the operator is locked by the tracking optical system;
   a re-turning on step of turning on the light source again after rotating the pedestal in a direction of a next survey setting point designated by the survey setting point data, and stopping the rotation; and a step of once turning off tracking light when the locking of the target is disturbed after the target is locked, turning on the light source again by directing again the optical axis in a direction of the survey setting point designated by the survey setting point data, and restarting searching and scanning with the tracking light.

* * * * *